United States Patent [19]
Ladden et al.

[11] Patent Number: 5,855,003
[45] Date of Patent: Dec. 29, 1998

[54] METHOD AND APPARATUS FOR ESTABLISHING A LINK IN A WIRELESS COMMUNICATION SYSTEM

[75] Inventors: Gregory C. Ladden, Vernon Hills; Eugene J. Bruckert, Arlington Heights, both of Ill.

[73] Assignee: Motorola, Inc., Schaumburg, Ill.

[21] Appl. No.: 728,731

[22] Filed: Oct. 11, 1996

[51] Int. Cl.[6] .................................................. G10L 3/00
[52] U.S. Cl. .......................... 704/270; 704/275; 375/219; 455/524
[58] Field of Search .................................. 455/524, 450; 704/270, 275, 221, 222

[56] References Cited

U.S. PATENT DOCUMENTS

| | | | |
|---|---|---|---|
| 5,187,810 | 2/1993 | Yoneyama et al. | 455/34.1 |
| 5,325,424 | 6/1994 | Grube | 379/94 |
| 5,438,565 | 8/1995 | Hemmady et al. | 370/60 |
| 5,513,211 | 4/1996 | Yabusaki et al. | 375/219 |
| 5,548,586 | 8/1996 | Kito et al. | 370/60 |
| 5,594,779 | 1/1997 | Goodman | 379/59 |
| 5,602,836 | 2/1997 | Papadopoulos et al. | 370/280 |
| 5,613,199 | 3/1997 | Yahagi | 455/33.1 |
| 5,633,873 | 5/1997 | Kay et al. | 370/336 |
| 5,651,056 | 7/1997 | Eting et al. | 379/88 |
| 5,657,376 | 8/1997 | Espeut et al. | 379/89 |
| 5,659,878 | 8/1997 | Uchida et al. | 455/426 |
| 5,675,344 | 10/1997 | Tong et al. | 342/457 |

*Primary Examiner*—David R. Hudspeth
*Assistant Examiner*—Michael N. Opsasnick
*Attorney, Agent, or Firm*—Richard A. Sonnentag

[57] ABSTRACT

A base station system (203, 303) in a wireless communication system (208, 308) establishes a link between a mobile station (200, 300) and a speech recognition system (209, 312). When the base station system (203, 303) determines that such a connection is required, the base station system (203, 303) instructs the mobile station (200, 300) to switch from a first codec (201) specific to human speech to a second codec (202) specific to speech recognition. Only after the switch between codecs in the mobile station (200, 300) does the base station system (203, 303) establish the link between the mobile station (200, 300) and the speech recognition system (209, 312).

19 Claims, 4 Drawing Sheets

METHOD AND APPARATUS FOR ESTABLISHING A LINK IN A WIRELESS COMMUNICATION SYSTEM

FIELD OF THE INVENTION

The present invention relates generally to establishing a link in a communication system and, more particularly, to establishing a link between a mobile station in a wireless communication system and a speech recognition system coupled to the wireless communication system.

BACKGROUND OF THE INVENTION

Current state-of-the-art coders/decoders, commonly called codecs, are designed to reproduce human speech for optimum human listening quality. Typically, these codecs are implemented in wireless communication systems requiring such optimum human listening quality. These codecs, however, do not optimally code speech for use by speech recognition equipment.

FIG. 1 generally depicts a wireless communication system 121, and specifically a digital Public Land Mobile Network (PLMN), which implements a low bit-rate digital speech codec. As shown in FIG. 1, a mobile station 100 (MS) implements a low bit-rate digital speech codec as does a base station system 106 (BSS) within a network infrastructure 103. The network infrastructure 103 also includes a Mobile Switching Center 109 (MSC) which performs switching functions and a Home Location Register 112 (HLR) which is used by the network infrastructure 103 to obtain unique data related to the MS 100, e.g. registration information. The MSC 109 can likewise implement the speech codec. The speech codec output is transmitted to a central office 115 (CO) where it is then converted to an analog signal by a Public Switched Telephone Network (PSTN) or by an Integrated Services Digital Network (ISDN) for transmission to a phone 118 within the land-based Plain Old Telephones Service (POTS) telephone system. Typically, there are people at both the MS 100 and the POTS phone 118 conversing via their respective phones.

When a Speech Recognition System (SRS) is substituted for a POTS phone 118 or is coupled directly to a network infrastructure 103, opportunities exist for providing enhanced capabilities within the wireless communication system. Thus, a need exists to provide such enhanced capabilities within the wireless communication system

DETAILED DESCRIPTION OF A PREFERRED EMBODIMENT

Figure 1:
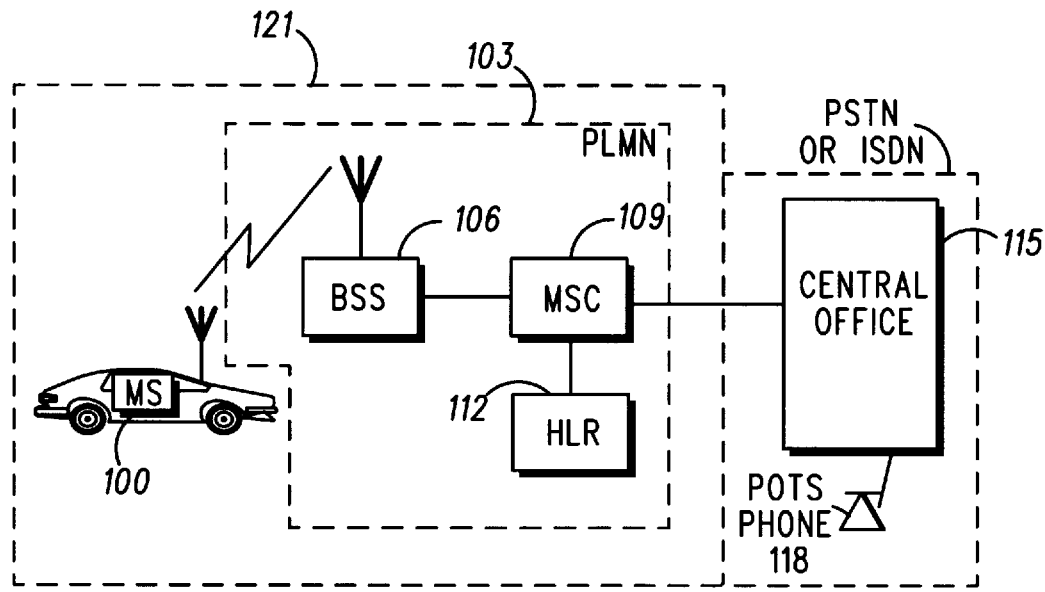
FIG. 1 generally depicts a prior art wireless communication system.

Generally stated, a base station system in a wireless communication system establishes a link between a mobile station and a speech recognition system. When the base station system determines that such a connection is required, the base station system instructs the mobile station to switch from a first codec specific to human speech to a second codec specific to speech recognition. Only after the switch between codecs in the mobile station does the base station system establish the link between the mobile station and the speech recognition system.

Stated specifically, a method of establishing a link between a mobile station in a wireless communication system and a speech recognition system in accordance with the invention comprises the steps of establishing a link between the wireless communication system and the mobile station implementing a codec in the mobile station compatible with speech and determining, in the wireless communication system, that the mobile station desires a link to the speech recognition system. Next, a link from the wireless communication system to the speech recognition system implementing speech coding functions in the wireless communication system is established, and the wireless communication system instructs the mobile station to change from the codec compatible with speech to a codec compatible with speech recognition. At this point, the link between the mobile station and the speech recognition system is established after the mobile station changes to the codec compatible with speech recognition.

In the preferred embodiment, the speech recognition system is coupled to either the wireless communication system or a public switched telephone network. In an embodiment where the speech recognition system is coupled to the wireless communication system, the speech coding functions in the wireless communication system are bypassed. In an embodiment where the speech recognition system is coupled to the public switched telephone network, the speech coding functions in the wireless communication system are bypassed and the link is routed to the speech recognition system via an interworking function. In this embodiment, the interworking function and the speech recognition system communicate via a standardized protocol which operates at a rate of at least 9.6 kilobits per second (kbps). In either embodiment described above, the wireless communication system can be either a code division multiple access (CDMA) wireless communication system or a time division multiple access (TDMA) wireless communication system.

In the preferred embodiment, the wireless communication system in accordance with the invention includes a means for establishing a speech communication between the wireless communication system and a mobile station compatible with the wireless communication system, where the speech communication implements speech coding functions in the wireless communication system and a codec in the mobile station compatible with speech. The wireless communication system also includes a means for determining that the mobile station requires connection to the speech recognition system and a means for instructing the mobile station to change from the codec in the mobile station compatible with speech to a codec compatible with speech recognition. After the mobile station has been instructed to change from the codec compatible with speech to the codec compatible with speech recognition, the wireless communication system employs means for coupling the mobile station to the speech recognition system to establish a link between the mobile station and the speech recognition system.

To determine that the mobile station requires connection to the speech recognition system, the wireless communication system includes either a means for detecting a message from the mobile station indicating that the mobile station requires a connection to the speech recognition system or a means for correlating information transmitted by the mobile station to the speech recognition system, where the information transmitted by the mobile station is a phone number related to the speech recognition system. When the mobile station no longer requires the connection to the speech recognition system, the means for instructing instructs the mobile station to change from the codec compatible with speech recognition to the codec compatible with speech.

The mobile station in accordance with the invention includes a first codec means for coding speech intended for a human and a second codec means for coding speech intended for a speech recognition system. The mobile station also includes a means for receiving a signal from the wireless communication system which instructs the mobile station to change between the first codec means and the second codec means. The mobile station in accordance with the invention further includes a means for transmitting information to the wireless communication system indicating a connection to the speech recognition system is required, where the information transmitted includes either a message indicating a connection to the speech recognition system is required or a phone number of a speech recognition system. In the preferred embodiment, the second codec means for coding speech intended for the speech recognition system is a front end portion similar to a front end portion of the speech recognition system.

Figure 2:
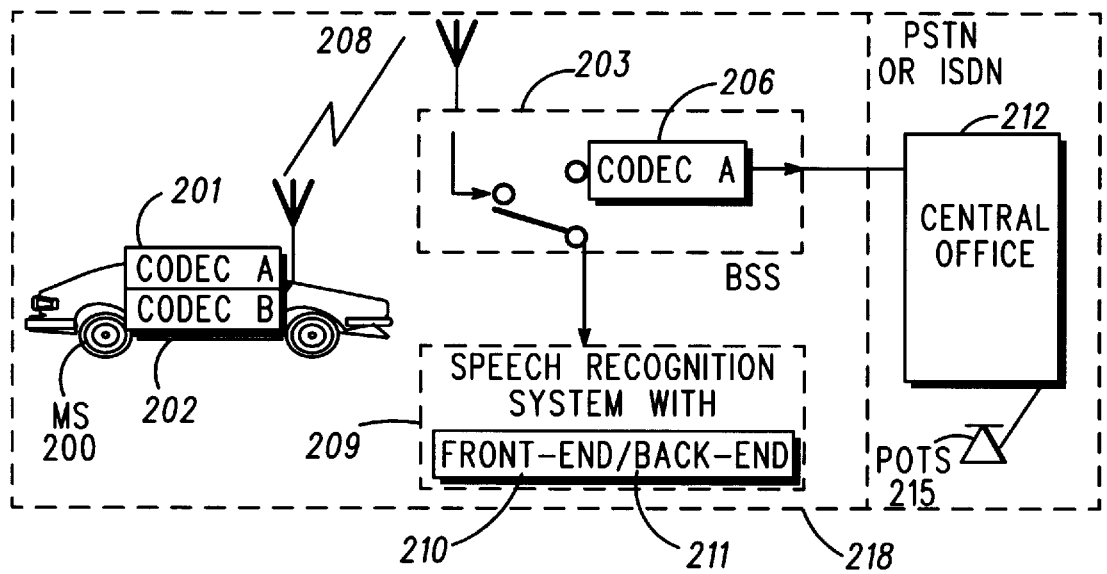
FIG. 2 generally depicts, in block diagram form, a speech recognition system coupled to a wireless communication system and a mobile station having two codecs in accordance with the invention.

FIG. 2 generally depicts a speech recognition system 209 (SRS) coupled to a PLMN in order to perform speech recognition on the low bit-rate digital speech signal originating at a mobile station 200 (MS). As can be seen in FIG. 2, MS 200 has two types of speech codecs, codec A 201 and codec B 202 in accordance with the invention. Codec A 201 is a typical digital codec optimized to code/decode human speech, while codec B 202 is specially designed to enhance the speech recognition capability of the speech recognition computer equipment located in the PLMN 208. In the preferred embodiment, codec B 202 is a front end portion similar to a front end portion 210 of the SRS 209. Speech recognition systems are well known in the art. For more information on speech recognition systems, see "*A Review of Large-vocabulary Continuos-speech Recognition*" by Steve Young, published in the September 1996 issue of IEEE Signal Processing Magazine and "*Robust Speaker Recognition*" by Richard J. Mammone et al., also published in the September 1996 issue of IEEE Signal Processing Magazine.

The SRS 209 of FIG. 2 can perform speech synthesis and act as a query recognizer for dialoging with the MS 200. Other capabilities of the SRS 209 include production of a written record of a phone conversation after performing speech recognition, (i.e., transcription service), language translation after performing speech recognition, query recognition after performing speech recognition, and keyword spotting so that automatic PLMN control can be invoked during a conversation. An example of this would be for a cellular telephone user to turn transcription services on and off during a conversation using keywords as the control.

As shown in FIG. 2, the SRS 209 is coupled to the base station system 203 (BSS) portion of the wireless communication system. In this embodiment, the speech coding functions, performed by codec A 206 in the BSS 203, are bypassed when the MS 200 requires connection to the SRS 209. In this scenario, the codec B 202 of the MS 200 communicates directly with the front-end 210 of the SRS 209 for optimum speech recognition by the SRS 209.

Figure 3:
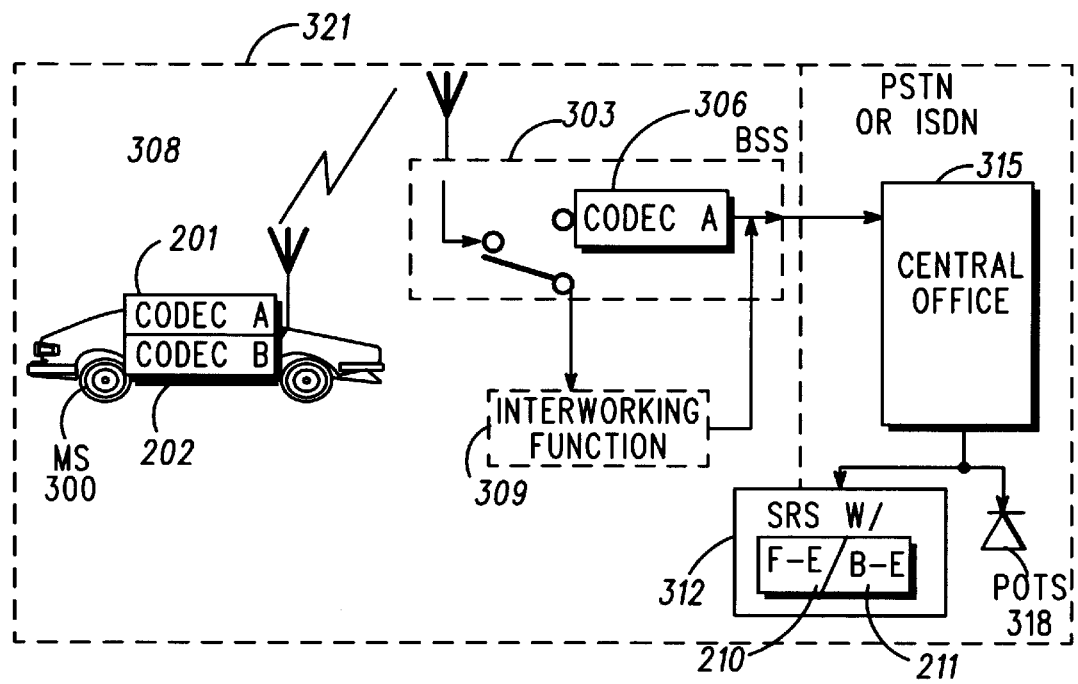
FIG. 3 generally depicts, in block diagram form, a speech recognition system coupled to a public switched telephone network (PSTN) via an interworking function (IWF) and a mobile station having two codecs in accordance with the invention.

FIG. 3 generally depicts an interworking function 309 (IWF) coupled to the PLMN in place of the SRS 209. The use of the IWF 309 enables the speech recognition process to be performed at the POTS end of the system and still use the optimized codec B (in this case, the front-end 210) for speech recognition. The signal output from codec B 202 of the MS 300 is in a digital form and must be transferred to the SRS 312 as such. The IWF 309 contains modems that transfer the digital data to a compatible modem located at the SRS 312. In the preferred embodiment, the transfer of the digital data is performed via a standardized protocol which operates at a rate of at least 9.6 kilobits per second (kbps), but can operate at a rate of 28.8 kbps. One such protocol (operating in data mode only) that could be implemented is the ITU V.70 standard for full Digital Simultaneous Voice & Data (DSVD) functionality, available from the International Telecommunications Union.

As shown in FIG. 3, the SRS 312 is coupled to the central office 315 (CO) of the PSTN. In this embodiment, the speech coding functions, performed by codec A 306 in the BSS 303, are bypassed when the MS 300 requires connection to the SRS 312. The bypass occurs via the IWF 309, which is primarily included in the wireless communication system to route digital data. In this scenario, the codec B 202 of the MS 300 communicates directly with the front-end 210 of the SRS 312 for optimum speech recognition by the SRS 312.

Figure 4:
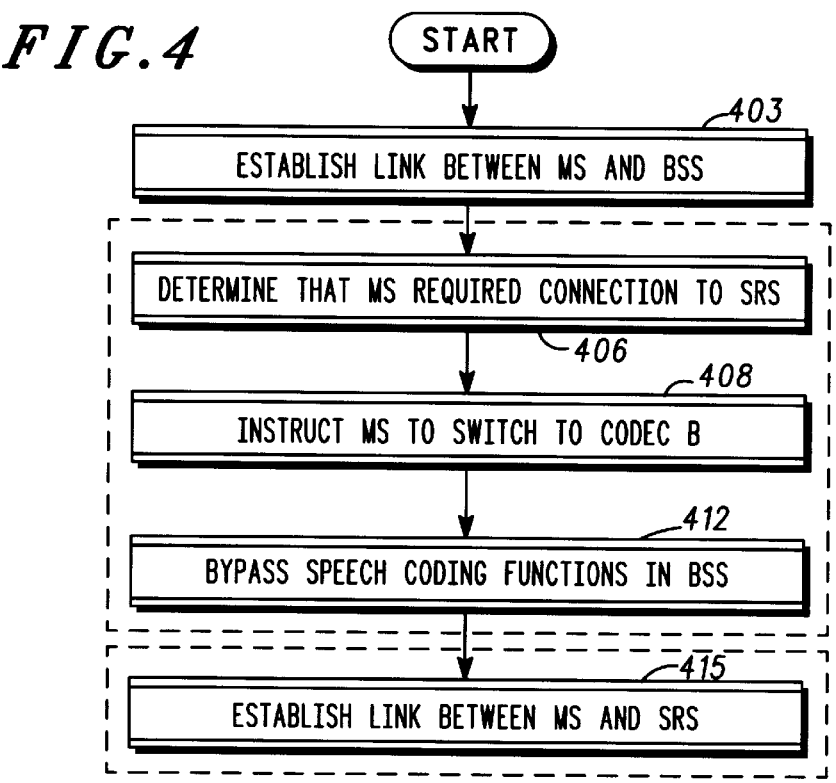
FIG. 4 generally depicts, in flow diagram form, the steps the wireless communication system undergoes to change codecs in the mobile station when the speech recognition system is implemented as shown in FIG. 2.

FIG. 4 generally depicts, in flow diagram form, the steps the wireless communication system undergoes to employ codec B 202 (see FIG. 2) of the MS 200 when the SRS 209 is coupled to the BSS 203. At 403, a link is established between the MS 200 and the BSS 203. Next, the BSS 203 determines at 406 that the MS 200 requires connection to the SRS 209. The BSS 203 performs the step at 406 by detecting a message from the mobile station 200 indicating that the mobile station 200 requires a connection to the speech recognition system or by correlating information transmitted by the mobile station 200 to the SRS 209, where the information transmitted by the mobile station is a phone number related to the SRS 209. In this embodiment, the BSS 203 has a memory of what phone numbers correspond to speech recognition systems. At step 408, the BSS 203 instructs the MS 200 to switch from codec A 201 to codec B 202, and the BSS 203 then bypasses, at step 412, the speech coding functions performed by codec A 206. The link is then established at 415 between the MS 200 and the SRS 209 in accordance with the invention.

Figure 5:
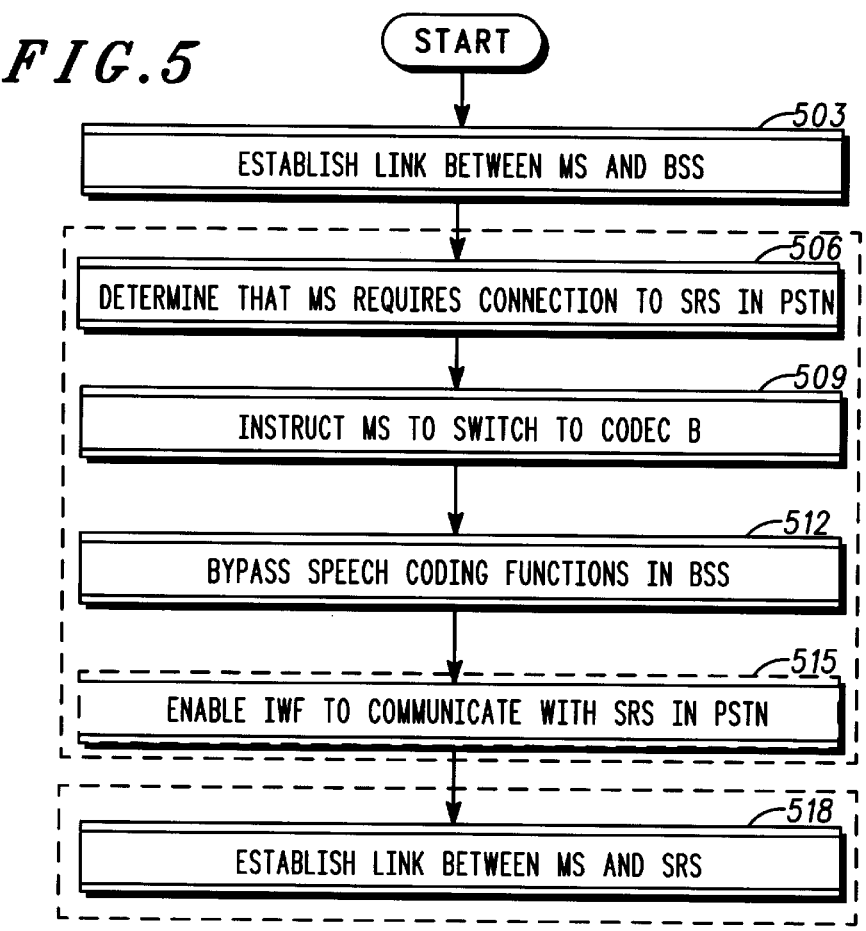
FIG. 5 generally depicts, in flow diagram form, the steps the wireless communication system undergoes to change codecs in the mobile station when the speech recognition system is implemented as shown in FIG. 3.

FIG. 5 generally depicts, in flow diagram form, the steps the wireless communication system undergoes to employ codec B 202 (see FIG. 3) of the MS 300 when the SRS 312 is coupled to the CO 315 in the PSTN. At 503, a link is established between the MS 300 and the BSS 303. Next, the BSS 303 determines at 506 that the MS 300 requires connection to the SRS 312. Again, the BSS 303 performs the step at 506 by detecting a message from the mobile station 300 indicating that the mobile station 300 requires a connection to the speech recognition system or by correlating information transmitted by the mobile station 300 to the SRS 312, where the information transmitted by the mobile station is a phone number related to the SRS 312. In this embodiment, the BSS 303 has a memory of what phone numbers correspond to speech recognition systems. At step 509, the BSS 303 instructs the MS 300 to switch from codec A 201 to codec B 202, and the BSS 303 then bypasses, at step 512, the speech coding functions performed by codec A 306. The IWF 309 is then enabled at step 515 so that it may communicate with the SRS 312, and the link is then established at 518 between the MS 300 and the SRS 312 in accordance with the invention.

In another call set-up scenario, a link between the MS 300 in the wireless communication system 308 and the SRS 312 is established by first establishing a link on a traffic channel (over the air-interface of the wireless communication system 308) between the BSS 303 and the MS 300 implementing the codec A 201 in the MS 300. Next, the traffic channel link so established is coupled to the SRS 312. Based on a request from the SRS 312, the traffic channel is changed to a digital data channel. The BSS 303 then instructs the MS 300 to change from the codec A 201 to the codec B 202. In this manner, the purely digital data transfer provided by the codec B 202 is performed over an air-interface channel that supports digital data. The digital data channel is utilized as long as the MS 300 requires connection to the SRS 312.

As one of ordinary skill in the art will appreciate, the SRS 209 and 312 of FIG. 2 and FIG. 3 respectively could instruct the MS 200/300 to change from codec A 201 to codec B 202. For example, a quality sensor within the SRS could determine that speech being interpreted is of poor quality, and notify the BSS that a change in codec is required. After this notification, the steps from step 408 and 509 to final link establishment would be the same.

Figure 6:
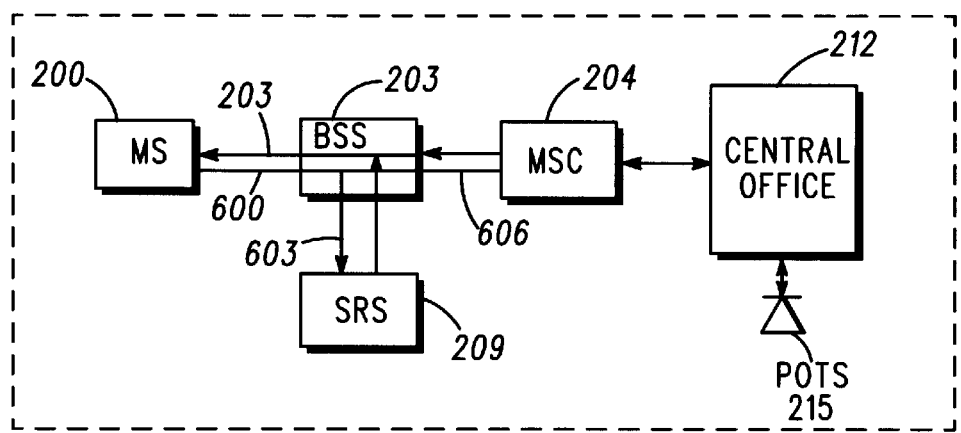
FIG. 6, FIG. 7 and FIG. 8 depict additional embodiments of how a mobile station accesses a speech recognition system when the speech recognition system is coupled to the wireless communication network as shown in FIG. 2
Figure 7:
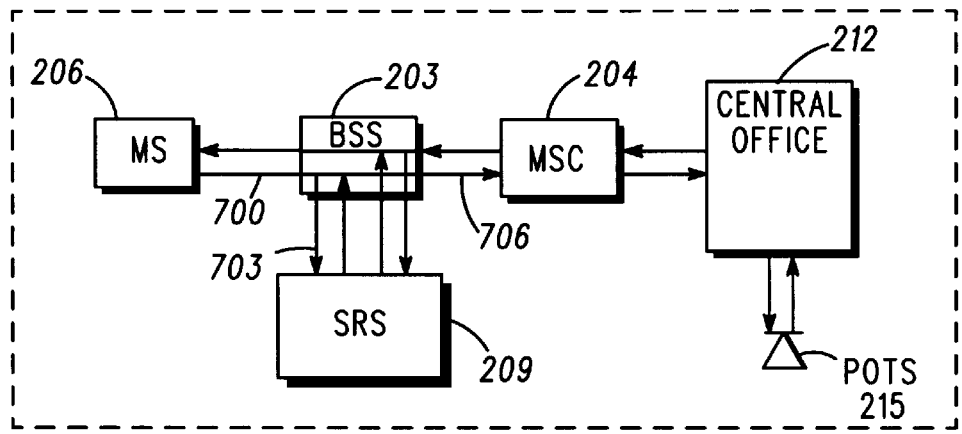
Figure 8:
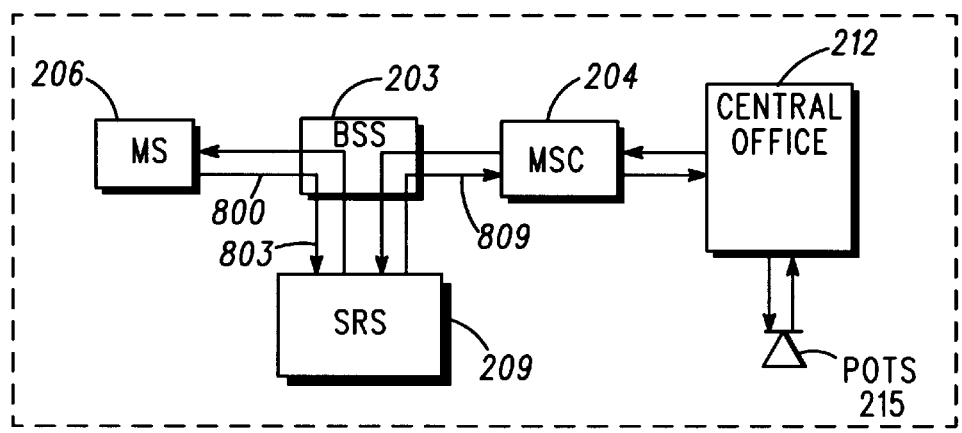

FIG. 6, FIG. 7 and FIG. 8 depict additional embodiments of how a MS 200 accesses a SRS 209 when the SRS 209 is coupled to the wireless communication network as shown in FIG. 2. Shown in FIG. 6 is an example of the exclusive use of the SRS 209 by the MS 200. In example, there is no call between the MS 200 and POTS phone 215. As shown in FIG. 6, the MS 200 uses the SRS 209 for transcription of the communication from the MS 200, command and control of the MS 200 and SRS 209 text-to-speech information generation to the MS 200. As shown in FIG. 6, signal 600 and signal 606 are used by the wireless communication system to set up a false POTS call so that the BSS 203 can force an over-the-air connection between the MS 200 and SRS 209 using signals 600 and 603. In this case, the BSS 203 knows that a link has been established, but without the POTS phone 215 being part of the communication.

FIG. 7 depicts an example of a call between the MS 200 and POTS phone 215 which includes the use of the SRS 209. In link establishment, a normal wireless communication system to POTS link is established using signals 700 and 706. Once the link is established, the SRS 209 is attached to the call using signals 703. This embodiment is used for MS 200/POTS call transcription, MS 200/POTS network Command & Control and SRS 209 text-to-speech information generation to the MS 200/POTS.

FIG. 8 depicts an example of a call between the MS 200 and POTS phone 215 but with the SRS 209 inserted in the signal path between the MS 200 and POTS phone 215. In this embodiment, the MS 200 sets up a call to the SRS 209 and to the POTS phone 215 as a service option request. The code division multiple access (CDMA) wireless communication system defined in TIA/EIA/IS-95, *Mobile Station-Base-station Compatibility Standard for Dual Mode Wideband Spread Spectrum Cellular System*, July 1993 makes such service options available. The MS 200 uses signal 800 and 803 to place the call and to connect to SRS 209. The BSS 203 uses signal 809 to place the call to the POTS phone 215 and uses signal 806 to connect the POTS phone 215 to the SRS 209. Once the call is placed, the SRS 209 can provide MS 200/POTS real-time language translation.

Figure 9:
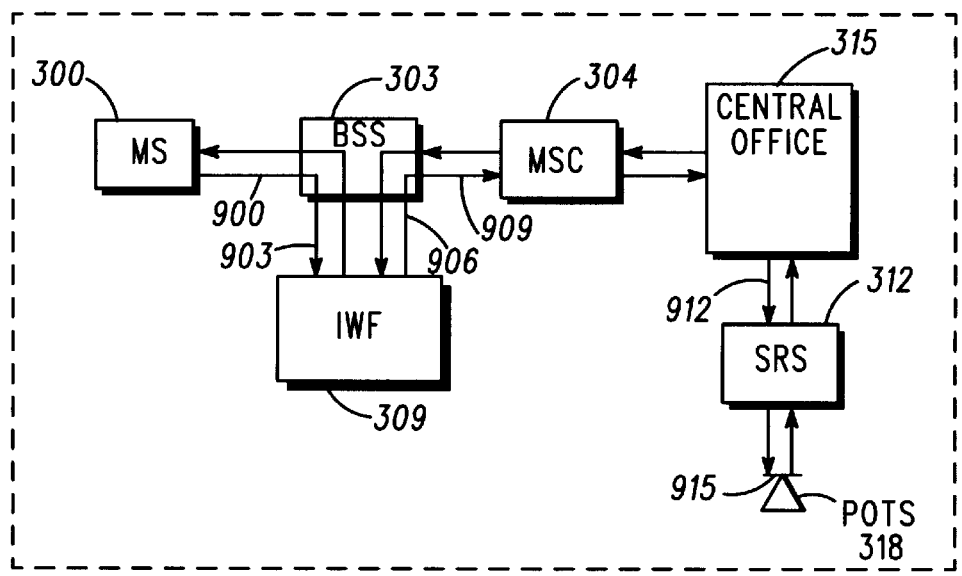
FIG. 9 depicts an additional embodiment of how a mobile station accesses a speech recognition system when the speech recognition system is coupled to the PSTN as shown in FIG. 3.

FIG. 9 depicts an example of the SRS 312 located external to the wireless communication system, and specifically coupled to a POTS phone 318. In this embodiment, the IWF 309 is assigned during call setup using signals 900, 903, 906, and 909. This is necessary so that speech data from the MS 300 can be carried in digital form over the PSTN to the SRS 312. The IWF 309 provides the modem capability for interworking with a companion modem in the SRS 312 as described above.

The SRS 312 has both a codec A and codec B so that the SRS 312 performs speech recognition on the codec B signals and converts the codec A signals to/from analog form for transmission to the attached analog POTS phone 318, using signals 915. The SRS 312 can source synthesized speech signals to both the POTS phone 318 and the MS 300. One such protocol that implements these functions is the ITU V.70 standard for full Digital Simultaneous Voice & Data (DSVD) functionality, available from the International Telecommunications Union operating in voice and data mode simultaneously where the total data rate is approximately 28.8 kilobits per second (kbps).

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What I claim is:

1. A method of establishing a link between a mobile station in a wireless communication system and a speech recognition system, the method comprising the steps of:

establishing a link between a base station system within the wireless communication system and the mobile station implementing a codec in the mobile station compatible with speech;

determining, in the base station system, that the mobile station requires a link to the speech recognition system;

establishing a link from the base station system to the speech recognition system implementing speech coding functions in the base station system;

instructing, from the base station system, the mobile station to change from the codec compatible with speech to a codec compatible with speech recognition; and establishing the link between the mobile station and the speech recognition system after the mobile station changes to the codec compatible with speech recognition.

2. The method of claim 1, wherein the speech recognition system is coupled to either the wireless communication system or a public switched telephone network.

3. The method of claim 2, wherein the step of establishing the link between the mobile station and the speech recognition system coupled to the wireless communication system further comprises the step of bypassing the speech coding functions in the wireless communication system.

4. The method of claim 2, wherein the step of establishing the link between the mobile station and the speech recognition system coupled to the public switched telephone network further comprises the step of bypassing the speech coding functions in the wireless communication system via an interworking function.

5. The method of claim 4, wherein the interworking function and the speech recognition system communicate via a standardized protocol.

6. The method of claim 5, wherein the standardized protocol operates at a rate of at least 9.6 kilobits per second (kbps).

7. The method of claim 1, wherein the wireless communication system is either a code division multiple access (CDMA) wireless communication system or a time division multiple access (TDMA) wireless communication system.

8. A wireless communication system interfacing with a speech recognition system, the wireless communication system comprising:
   means for establishing a speech communication between a base station system within the wireless communication system and a mobile station compatible with the wireless communication system, the speech communication implementing speech coding functions in the base station system and a codec in the mobile station compatible with speech;
   means for determining that the mobile station requires connection to the speech recognition system;
   means for instructing the mobile station to change from the codec in the mobile station compatible with speech to a codec compatible with speech recognition; and
   means for coupling the mobile station to the speech recognition system after the mobile station has been instructed to change from the codec compatible with speech to the codec compatible with speech recognition.

9. The wireless communication system of claim 8, wherein the means for determining that the mobile station requires connection to the speech recognition system further comprises means for detecting a message from the mobile station indicating the mobile station requires connection to the speech recognition system.

10. The wireless communication system of claim 8, wherein the means for determining that the mobile station requires connection to the speech recognition system further comprises means for correlating information transmitted by the mobile station to the speech recognition system.

11. The wireless communication system of claim 10, wherein the information transmitted by the mobile station further comprises a phone number related to the speech recognition system.

12. The wireless communication system of claim 8, wherein the means for instructing further comprises means for instructing a switch within the base station system to bypass the speech coding functions of the base station system and couple the mobile station directly to the speech recognition system when the speech recognition system is coupled to the wireless communication system.

13. The wireless communication system of claim 12, wherein the means for instruction the switch within the base station system to bypass the speech coding functions of the wireless communication system and couple the mobile station directly to an interworking function (IWF) when the speech recognition system is coupled to a public switched telephone network (PSTN).

14. The wireless communication system of claim 8, wherein the means for instructing further comprises means for instructing the mobile station to change from the codec compatible with speech recognition to the codec compatible with speech when the mobile station no longer requires the connection to the speech recognition system.

15. A mobile station compatible with a wireless communication system, the mobile station comprising:
   first codec means for coding speech intended for a human;
   second codec means for coding speech intended for a speech recognition system;
   means for receiving a signal from the wireless communication system instructing the mobile station to change between the first codec means and the second codec means.

16. The mobile station of claim 15, further comprising means for transmitting information to a base station system within the wireless communication system indicating a connection to the speech recognition system is required.

17. The mobile station of claim 16, wherein the information transmitted further comprises either a message indicating a connection to the speech recognition system is required or a phone number of a speech recognition system.

18. A method of establishing a link between a mobile station in a wireless communication system and a speech recognition system, the method comprising the steps of:
   establishing a link on traffic channel between a base station system within the wireless communication system and the mobile station implementing a codec in the mobile station compatible with speech;
   coupling the traffic channel link to the speech recognition system;
   changing the link from a traffic channel to a digital data channel based on a request from the speech recognition system; and
   instructing, from the base station system, the mobile station to change from the codec compatible with speech to a codec compatible with speech recognition.

19. The method of claim 18, wherein the digital data channel is utilized as long as the mobile station requires connection to the speech recognition system.

* * * * *

UNITED STATES PATENT AND TRADEMARK OFFICE
CERTIFICATE OF CORRECTION

PATENT NO. : 5,855,003
DATED : December 29, 1998
INVENTOR(S) : Ladden, et al.

It is certified that error appears in the above-indentified patent and that said Letters Patent is hereby corrected as shown below:

Column 8, line 9 reads "instruction" should be --instructing instructs--.

Signed and Sealed this

Eleventh Day of May, 1999

Attest:

Q. TODD DICKINSON

*Attesting Officer*  *Acting Commissioner of Patents and Trademarks*